United States Patent
Hopperstad et al.

(10) Patent No.: US 9,025,417 B2
(45) Date of Patent: May 5, 2015

(54) SYSTEMS AND METHODS FOR OPTIMIZING LOW FREQUENCY OUTPUT FROM AIRGUN SOURCE ARRAYS

(75) Inventors: Jon-Fredrik Hopperstad, Cambridge (GB); Robert Laws, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 858 days.

(21) Appl. No.: 13/112,869

(22) Filed: May 20, 2011

(65) Prior Publication Data

US 2012/0048642 A1 Mar. 1, 2012

Related U.S. Application Data

(60) Provisional application No. 61/376,464, filed on Aug. 24, 2010.

(51) Int. Cl.
*G01V 1/38* (2006.01)
*G01V 1/137* (2006.01)

(52) U.S. Cl.
CPC ...... *G01V 1/3861* (2013.01); *G01V 2210/1212* (2013.01); *G01V 1/137* (2013.01)

(58) Field of Classification Search
CPC .................................................. G01V 1/3861
USPC ......................................................... 367/144
See application file for complete search history.

(56) References Cited

U.S. PATENT DOCUMENTS

| | | | | |
|---|---|---|---|---|
| 4,038,630 A | * | 7/1977 | Chelminski | 367/23 |
| 4,271,924 A | * | 6/1981 | Chelminski | 181/120 |
| 4,382,486 A | * | 5/1983 | Ruehle | 181/118 |
| 4,875,545 A | * | 10/1989 | Pascouet | 181/115 |
| 4,949,315 A | * | 8/1990 | Pascouet | 367/144 |
| 4,956,822 A | | 9/1990 | Barber et al. | |
| 4,970,046 A | | 11/1990 | Dolengowski | |
| 5,469,404 A | | 11/1995 | Barber et al. | |
| 5,980,148 A | | 11/1999 | Pascouet | |
| 6,364,569 B1 | | 4/2002 | Pascouet | |
| 7,016,261 B2 | | 3/2006 | Quinn et al. | |
| 7,042,803 B2 | | 5/2006 | Kutty et al. | |
| 2004/0000446 A1 | * | 1/2004 | Barber, Sr. | 181/120 |
| 2006/0076183 A1 | | 4/2006 | Duren et al. | |
| 2008/0011540 A1 | | 1/2008 | Moldoveanu et al. | |

FOREIGN PATENT DOCUMENTS

GB 2176605 A 12/1986

OTHER PUBLICATIONS

Krail, P.M., Airguns: Theory and operation of the marine seismic source. Course notes for GEO-391: Principles of seismic data acquisition. (C) University of Texas at Austin 2010. http://repositories.lib.utexas.edu/bitstream/handle/2152/11226/Principles%20of%20airgun%20operation_final_5_2011.pdf. Downloaded on Sep. 30, 2014.*

International Search Report and Written Opinion of PCT Application No. PCT/US2011/047347 dated Apr. 6, 2012.

(Continued)

*Primary Examiner* — Ari M Diacou (57) ABSTRACT

Systems and methods for optimizing low frequency output of marine sources are described. The marine source arrangements and associated methods disclosed herein seek to fully frequency lock bubbles emitted by airguns in close proximity to one another. In this manner, larger effective bubble volumes can be achieved, thus increasing low frequency output.

13 Claims, 8 Drawing Sheets

(56) References Cited

OTHER PUBLICATIONS

Beatty, "Bubble Frequencies of Air Gun Sources," Naval Research Laboratory Memorandum Report 2503, Sep. 1972, pp. 1-12.

Pengyao et al., "Study and Simulation of Large Volume Air-gun Array Based on Ziolkowski Model," 2010 International Forum on Information Technology and Applications (IFITA), Jul. 2010: pp. 450-453.

Cotton et al., "System source analyses for the SeaScan Tri-Cluster Seismic Sound Source System—Final Report", Mar. 2003: pp. 1-173, <http://www.seascanseismic.com/reports/seascansourceanalysis.pdf>.

Giles et al., "System approach to air-gun array design", Geophysical Prospecting, 1973, vol. 21: pp. 77-101.

Larner et al., "Desired seismic characteristics of an air gun source", Geophysics, Sep. 1982, vol. 47(9): pp. 1273-1284.

Laws et al., "Computer modelling of clustered airguns", First Break, Sep. 1990, vol. 8(9): pp. 331-338.

Mougenot, "Toward the low frequencies: land and marine equipment", First Break, Jul. 2006, vol. 24: pp. 37-41.

SeaSCAN Inc., specification of 2400 in Tri-Cluster, Retrieved Dec. 9, 2009: pp. 1-6, <http://www.seascanseismic.com/Products_files/Sea_Scan_2x1200_3m_Specifications.pdf>.

Strandenes et al., "Signatures from clustered airguns", First Break, Aug. 1992, vol. 10(8): pp. 305-312.

Vaage et al., "Interaction between airguns", Geophysical Propsecting, 1984, vol. 32: pp. 676-689.

Ziolkowski et al., "Use of low frequencies for sub-basalt imaging", Geophysical Prospecting, 2003, vol. 51: pp. 169-182.

\* cited by examiner

SYSTEMS AND METHODS FOR OPTIMIZING LOW FREQUENCY OUTPUT FROM AIRGUN SOURCE ARRAYS

CROSS-REFERENCE TO RELATED APPLICATIONS

This application claims the benefit of U.S. Provisional Patent Application No. 61/376,464, filed Aug. 24, 2010, which is incorporated herein by reference in its entirety.

TECHNICAL FIELD

The present disclosure relates in general to seismic source arrays, and more particularly to systems and methods for optimizing low frequency output of such source arrays.

BACKGROUND

In seismic applications, airgun source arrays are often used to generate acoustic output, which when reflected off of subsurface formations may be detected by associated seismic receivers. Such data is often used to build up an image of subsurface formations for assessing the likelihood of hydrocarbon production.

The low frequency output of marine airgun seismic sources is limited by the resonance frequency of the largest airgun volume in the source array. This oscillation frequency, also referred to as the fundamental bubble frequency, is given by the well-known Rayleigh-Willis formula:

$$f = k \frac{(1 + d/10)^{5/6}}{(P \cdot V)^{1/3}} \quad (1)$$

Where f is the bubble frequency measured in Hertz, d is the source depth in meters, P is the firing pressure in psi (pound per square inch), V is the bubble volume in cubic inches and k is an empirical constant; k=506 matches well with measurements of conventional airguns.

Decreasing the bubble frequency requires a bigger bubble volume. The volume increase should be substantial since the bubble frequency is inversely proportional to the cube-root of the bubble volume. Some have recommended increasing the largest bubble volume as a way to increase the low frequency source output.

When airguns fire in a cluster, the resulting bubble frequency substantially equals that of a single gun of the combined volume. Earlier work on cluster design focused on maximizing the primary-to-bubble ratio of the resulting source signature. Such is the airgun cluster design in use today, where the clustered airguns are typically separated by less than one meter, and where the airgun bubbles coalesce into one non-spherical bubble. Other airguns in the source array are only weakly interacting, and the volume of these guns is normally chosen to achieve maximum destructive interference of the bubble amplitude of the overall source signature. This is known as a 'tuned array'.

SUMMARY

The present disclosure describes a source design that comprises airgun cluster(s) with significantly larger total volume than earlier considered. In some embodiments, high pressure gas is released by multiple airguns in close proximity, such that the resulting bubble oscillates with the frequency associated with the total cluster volume. The total cluster volume may be a portion of or equal to the total active source volume. In other embodiments, source designs are described, which generate an effective bubble volume of more than 2000 in$^3$. Related methods for optimizing low frequency output of source arrays are described.

In some embodiments, the airgun source arrays according to the present disclosure may take the form of a towed source deployed from a vessel. However, in other embodiments the disclosed airgun source arrays may be deployed from a stationary object, e.g. a rig or a stationary vessel. In still further embodiments, the disclosed airgun source arrays may be deployed from a supply boat by, for example, cranes positioned on the supply boat. The teachings of the present disclosure may be used in both towed array seismic surveys as well as vertical seismic profiling (VSP) surveys and further in borehole and seabed seismic applications.

The foregoing has outlined some of the features and technical advantages of the present disclosure in order that the detailed description that follows may be better understood. Additional features and advantages of the present disclosure will be described hereinafter which form the subject of the claims.

BRIEF DESCRIPTION OF THE DRAWINGS

The foregoing and other features and aspects of the present disclosure will be best understood with reference to the following detailed description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

Figure 1:
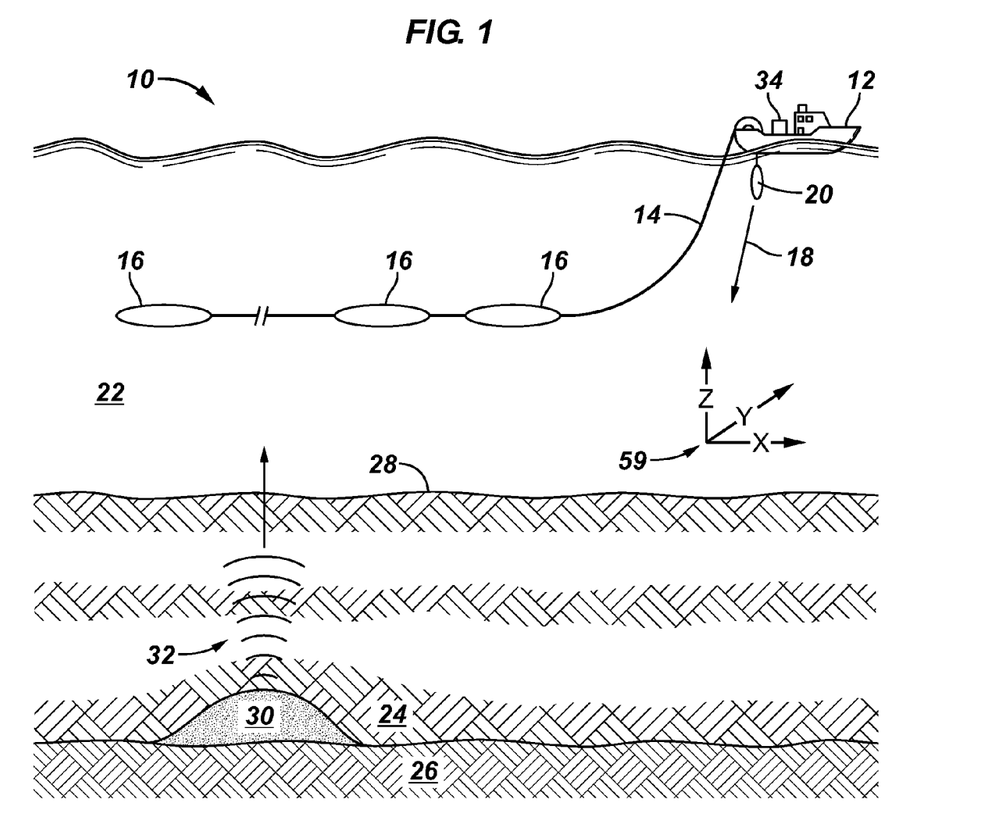
FIG. 1 is a schematic diagram of a marine seismic data acquisition system according to an embodiment of the disclosure.

FIG. 1 depicts an embodiment 10 of a marine seismic data acquisition system in accordance with some embodiments of the disclosure. In the system 10, a survey vessel 12 tows one or more seismic streamers 14 (one exemplary streamer 14 being depicted in FIG. 1). The seismic streamers 14 may be several thousand meters long and may contain various support cables (not shown), as well as wiring and/or circuitry (not shown) that may be used to support communication along the streamers 14. In general, each streamer 14 includes a primary cable into which is mounted seismic sensors 16 that record seismic signals. It is to be appreciated that the sensors 16 are illustrated schematically for emphasis in FIG. 1, and that in practice, the sensors 16 are disposed within the streamer cable 14. The seismic sensors 16 may include pressure sensors (e.g., hydrophones) and/or particle motion sensors (e.g., accelerometers).

The marine seismic data acquisition system 10 includes a seismic source 20 that typically takes the form of an array of airguns. In some embodiments of the disclosure, the seismic source 20 may be towed by the survey vessel 12. In other embodiments, the seismic source 20 may operate independently of the survey vessel 12, in that the seismic source may be coupled to other vessels, buoys or rigs, as just a few examples.

As the seismic streamers 14 are towed behind the survey vessel 12, acoustic signals 18 (an exemplary acoustic signal 18 being depicted in FIG. 1), are produced by the seismic source 20 and are directed down through a water column 22 into strata 24 and 26 beneath a water bottom surface 28. The acoustic signals 18 are reflected from the various subterranean geological formations, such as an exemplary formation 30 that is depicted in FIG. 1. The incident acoustic signals 18 produce corresponding reflected acoustic signals, or pressure waves 32, which are sensed by the seismic sensors 16.

The goal of the seismic acquisition is to build up an image of a survey area for purposes of identifying subterranean geological formations, such as the exemplary geological formation 30. Subsequent analysis of the representation may reveal probable locations of hydrocarbon deposits in subterranean geological formations. Depending on the particular embodiment of the disclosure, portions of the analysis of the representation may be performed on the seismic survey vessel 12, such as by a signal processing unit 34.

Figure 2:
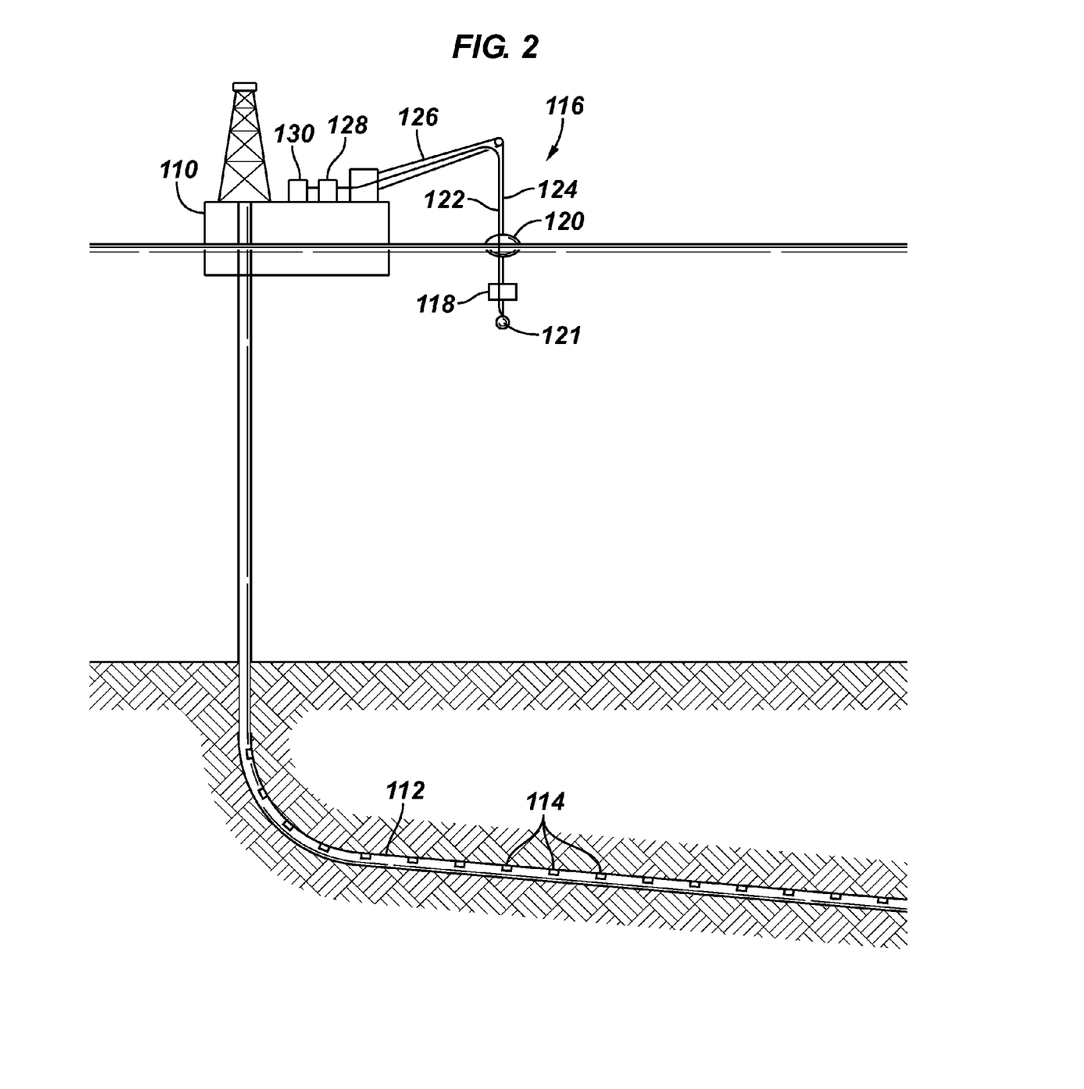
FIG. 2 is a schematic diagram of a VSP arrangement according to an embodiment of the disclosure.

In addition to towed marine applications, the present disclosure is also applicable to VSP surveys. A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit. Referring to FIG. 2, a simplified view of an offshore rig 110 positioned over a subsea borehole 112 is shown. The borehole 112 contains a plurality of spaced receivers 114 to facilitate, for example, a VSP acquisition. The rig 110 is shown supporting a conventional seismic survey apparatus designated generally as 116. The survey apparatus 116 includes a source 118, which takes the form of an air-gun or guns suspended below the surface by a float 120. An analog hydrophone 121 is suspended below the air guns 118 and may provide information for correcting time break errors (errors attributable to time differences for swells, irregular source firings, etc.).

One or more analog lines 122 form part of an umbilical 124 that may also include an air line. The analog lines 122 traverse a handling system, such as a crane 126. The analog lines 122 provide an analog communications/control link between the guns 118, the hydrophone 121, a gun controller 128, and a computer processor 130.

Having generally described an exemplary seismic data acquisition process and an exemplary VSP technique, attention is now directed to the seismic source 20 (FIG. 1), 118 (FIG. 2), which may take the form of an airgun cluster. In VSP applications, seismic sources are normally comprised of airgun clusters; typically one to four clusters, wherein each cluster includes two to four airguns. Airgun clusters are also prevalent in source arrays for towed marine, seabed seismic and some borehole seismic applications. The teachings of the present disclosure may be utilized in any of the aforementioned settings.

The widespread use of airgun clusters can be attributed to two main characteristics. First, clustering of medium sized airguns can achieve the same bubble frequency as a large single airgun with the same total volume. Airgun clusters are considered more robust and easier to handle than large single airguns. Secondly, airgun clusters have higher peak-to-bubble ratio than the equivalent sized single airgun, and are therefore well-suited for tuned arrays.

Figure 3:
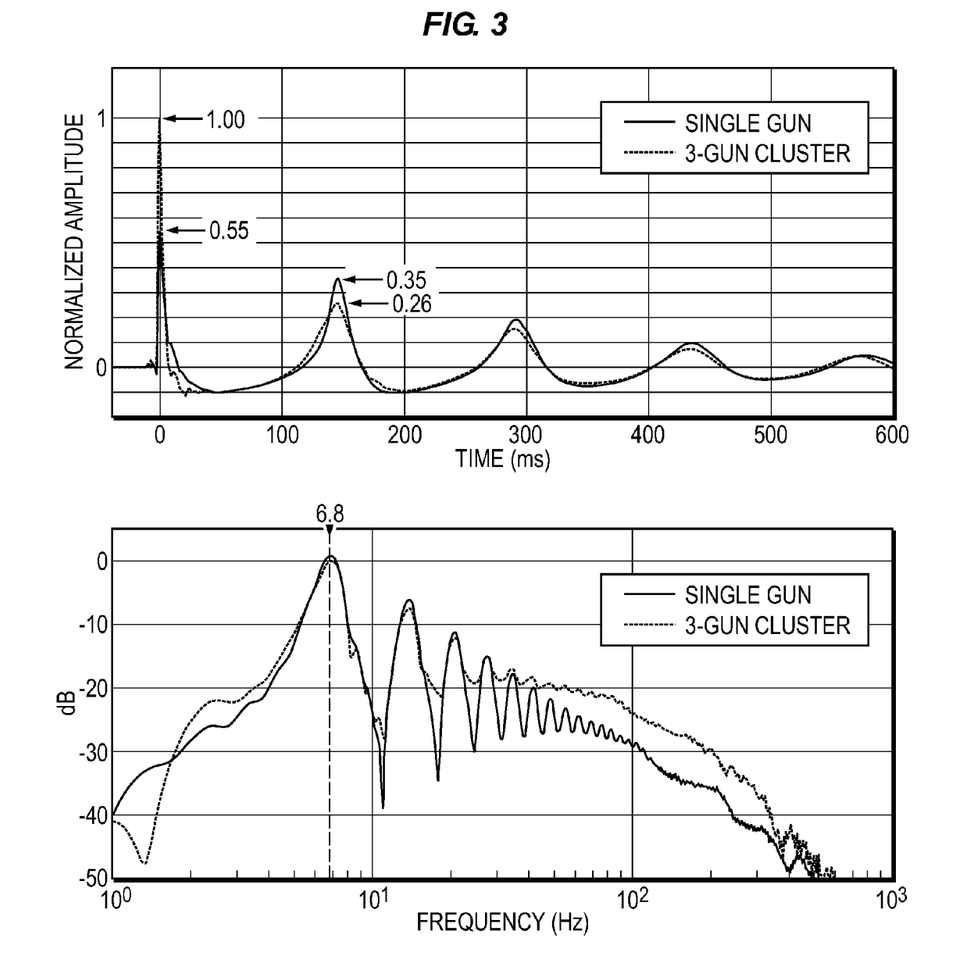
FIG. 3 is a graphical depiction of a source signature of conventional gun arrangements.

The higher peak-to-bubble ratio associated with airgun clusters is illustrated in the top panel of FIG. 3, which compares a single airgun of about 600 in$^3$ with a three-gun cluster with the same total volume; the measurement bandwidth is 0-500 Hz. The three-gun cluster has a primary-to-bubble ratio of 1.00/0.26≈3.9, while the single airgun has a primary-to-bubble ratio of 0.55/0.35≈1.6. The higher peak-to-bubble ratio manifests itself in a flatter spectrum in the bottom panel of FIG. 2.

The spectral comparison also indicates that the output at the bubble frequency, i.e. 6.8 Hz, is substantially identical. It has been found that no matter how you arrange the cluster to release the air, the spectral level at the bubble frequency is substantially the same. In accordance with this observation, the present disclosure seeks to optimize low frequency output by implementing large airgun cluster(s), whose volume is larger than what is considered practical for a single airgun.

The low frequency output of airgun sources is limited by the resonance frequency of the largest bubble volume in the array. In conventional seismic sources, and especially for source arrays used in towed marine, the volume of the largest bubble is small compared with the total source volume. Accordingly, there is scope for increasing the low frequency output, without increasing the total gas volume, by shifting the bubble frequency towards zero. The lower resonance frequency is achieved by releasing a larger amount of gas into one big bubble or multiple frequency locked bubbles.

Airgun bubbles can exhibit cluster-type oscillation frequency even at non-coalescing distances. For example, the bubbles from two closely spaced airguns of different volume may oscillate with the same frequency (the frequency of the combined volume), even though the bubbles are not coalescing. In fact, they may not even be touching. The bubble interaction is entirely through the pressure field. This phenomenon is known as frequency locking. Bubbles are 'fully frequency locked' when their bubble frequency substantially equals that associated with the combined volume. Not fully interacting bubbles are commonly referred to as 'partially frequency locked', and as 'non-interacting' when the presence of the other bubbles do not affect the oscillation frequency.

Figure 4:
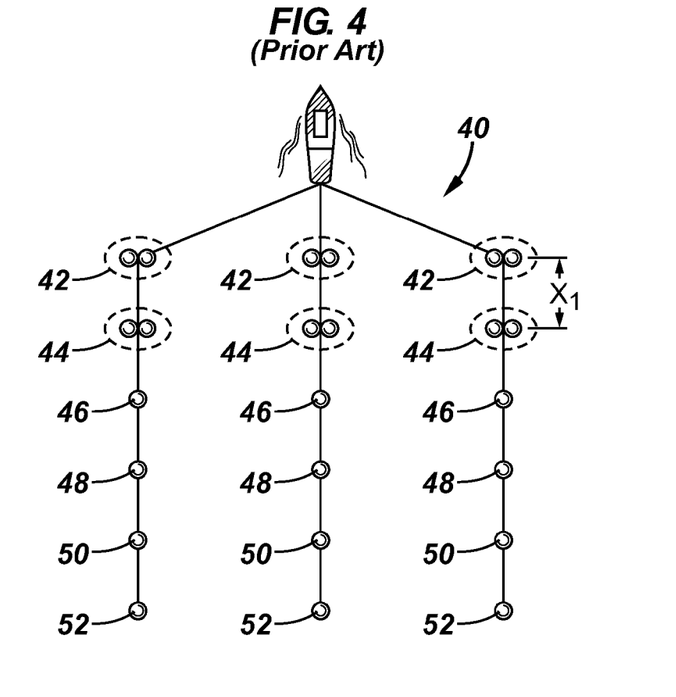
FIG. 4 is a schematic depiction of a tuned conventional source array.

FIG. 4 depicts an example of a typical prior art airgun array 40 in which single and clustered airguns are spaced at 3 meters in the in-line direction. The largest cluster 42 in the array 40 has a volume of 2×290 in³=580 in³. The two cluster bubbles are fully frequency locked to each other, and partially frequency locked to an adjacent cluster 44, which has a volume of 2×195 in³. Accordingly, the 2×290 in³ bubbles oscillate with a frequency corresponding to an effective volume of about 750 in³. The array 40 further includes single airguns 46, 48, 50, 52 with volumes 280 in³, 195 in³, 145 in³, 105 in³, respectively, resulting in a total volume of each string/subarray of 1695 in³ and a total source array volume of 5085 in³. Thus, the largest bubble in array 40 uses only 750/1695≈44% of the available subarray volume, and only 750/5085≈15% of the total source volume available. "Source volume" as used in the present disclosure means the total volume of airguns fired at each shot and excludes volumes that could be generated by guns (e.g., spare guns) not used during the shot. These numbers are quite typical for prior art source arrays. The total high pressure gas capacity available is used to generate many weakly interacting bubbles, and the largest bubble is small compared with the total source volume.

In contrast, source designs according to the present disclosure aim to optimize the use of available high pressure gas capacity for generating very low frequencies. In order to extend the source bandwidth as much as possible towards zero Hertz, substantially all of the available high pressure gas should be released into one huge bubble oscillation. This can be achieved with an airgun cluster wherein some or all cluster bubbles are fully frequency locked, i.e., the cluster bubbles oscillate with the frequency associated with the total cluster volume. Various examples of implementing the teachings of the present disclosure will now be described. It is to be appreciated, however, that these are merely examples and other methods and arrangements of achieving full frequency locking of cluster bubbles are contemplated as falling within the scope of the present disclosure.

Example 1

Source Array Wherein the Largest Bubble is One-Third of the Total Source Volume

One aspect of the present disclosure is to release the largest quantity of high pressure gas possible into one location, in order to maximize the very low frequency output. There might be several factors limiting the largest bubble in an array, for example, the total source volume might be limited by the onboard compressor capacity and the seismic shot interval. The total source volume might also be limited by the flow capacity of the conduits (e.g., hoses) connecting the source and the onboard compressor or onboard high pressure reservoir, or it might be limited by the number of high pressure hoses the ship can tow.

Figure 5:
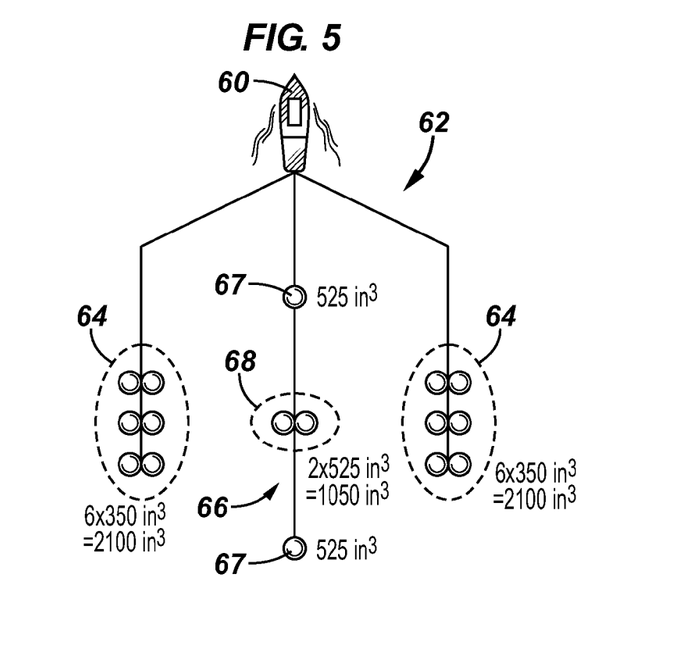
FIG. 5 is a schematic depiction of a source array designed to optimize low frequency output according to the principles of the present disclosure.

Similarly, the largest bubble in the source array might be limited by how much of the total source volume that can be released into substantially one location. FIG. 5 depicts one embodiment of the present disclosure where the largest bubble is limited by the flow capacity of the high pressure hoses that connects the source to the vessel. A vessel 60 tows a source array 62, which includes a pair of substantially identical subarrays 64 disposed about another subarray 66 (which includes a pair of single airguns 67 disposed about a cluster 68 in the in-line direction). The cross-line spacing between subarrays 64 and 66 is preferably 6 meters and the in-line spacing between each of the single airguns 67 and the cluster 68 is preferably 6 meters. In this embodiment, each subarray 64, 66 is charged by a shipborne high pressure reservoir via one high pressure hose, whose flow capacity is approximately 2100 in³ per shot. In this example, the source array 62 is further limited by how close one can place two hoses, and consequently it is not possible to frequency lock the bubbles from different subarrays. Hence, the largest bubble possible is 2100 in³. The bubble frequency associated with 2100 in³ is achieved by fully frequency locking six 350 in³ airgun bubbles, while the bubble frequency associated with 1050 in³ is achieved by fully frequency locking two 525 in³ airgun bubbles. The dashed lines indicate the regions with full frequency locking. The interaction between the regions is negligible, and it is also negligible between any region and any of the single airgun bubbles.

The effective bubble volume of the subarrays 64 is substantially 2100 in³, while the subarray 66 has two distinct bubble frequencies: the frequencies associated with a bubble volume of 1050 in³ and 525 in³. These volumes result in bubble frequencies that are ⅓ and ⅔ of an octave higher than the lowest bubble frequency. In this example, the outer subarrays 64 have been optimized according to the present disclosure, while the subarray 66 is used to fill-in the bubble notch frequencies in order to flatten the spectrum in a conventional manner. In this example, the largest effective bubble volume is approximately 33.3% of the total source volume, i.e. 2100 in³ out of 6300 in³ total volume.

Example 2

Source Array Wherein the Largest Bubble Equals the Total Source Volume

Figure 6:
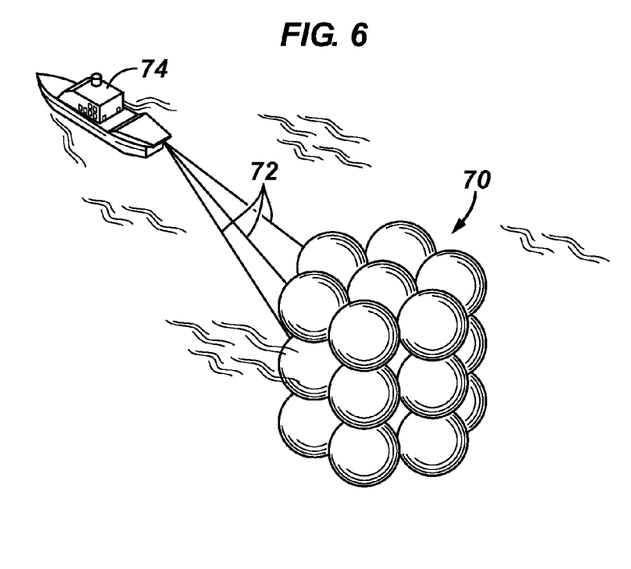
FIG. 6 is a schematic depiction of another source array designed to optimize low frequency output according to the principles of the present disclosure.

FIG. 6 depicts a schematic view of an alternative source to that disclosed in Example 1, wherein all of the released gas is frequency locked into one very large airgun bubble. In the embodiment of FIG. 6, a source 70 comprises twenty-one 300 in³ airgun bubbles arranged on a hexagonal grid in three layers. The airguns are connected to a plurality of high pressure hoses 72, which extend from a vessel 74. In this arrangement, the high pressure hoses 72 terminate at substantially the same location, thus enabling the guns to be positioned within full frequency locking distance. All twenty-one airgun bubbles are fully frequency locked and oscillate with the period associated with the combined volume, e.g. 6300 in³. Thus, the volume of the largest effective bubble equals the total source volume. Although a specific number of airguns with specific bubble volumes are described in this example, it is to be appreciated that such numbers and volumes may be altered while still enabling full frequency locking of the array.

Figure 7:
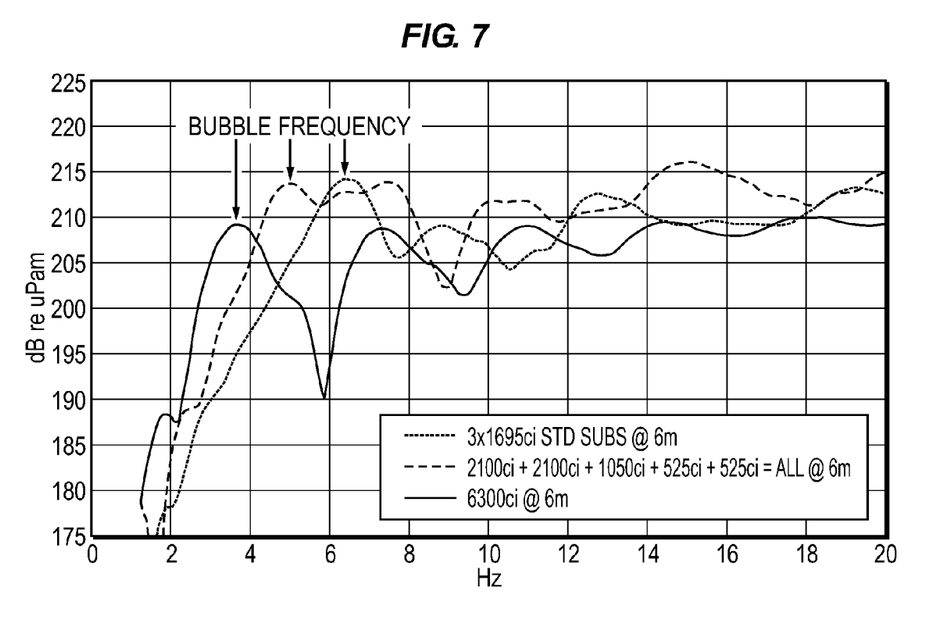
FIG. 7 is a graphical depiction comparing the optimized low frequency output source arrays of FIGS. 5 and 6 with the conventional source array of FIG. 4.

FIG. 7 compares the modeled spectra of the conventional source in FIG. 4 (dotted curve) wherein the largest effective bubble volume is 15% of the total source volume; the new source illustrated in FIG. 5 (dashed curve) wherein the largest effective bubble volume is approximately 33% of the total source volume; and the new source shown in FIG. 6 (solid curve) wherein the effective bubble volume is 100% of the total source volume. The comparison of FIG. 6 demonstrates how the low frequency output increases with the size of the effective bubble volume as both the dashed and the solid curves have significantly more low frequency output than the conventional reference spectrum (dotted curve).

Example 3

Array Wherein the Largest Bubble Equals Half of the Total Source Volume

Figure 8:
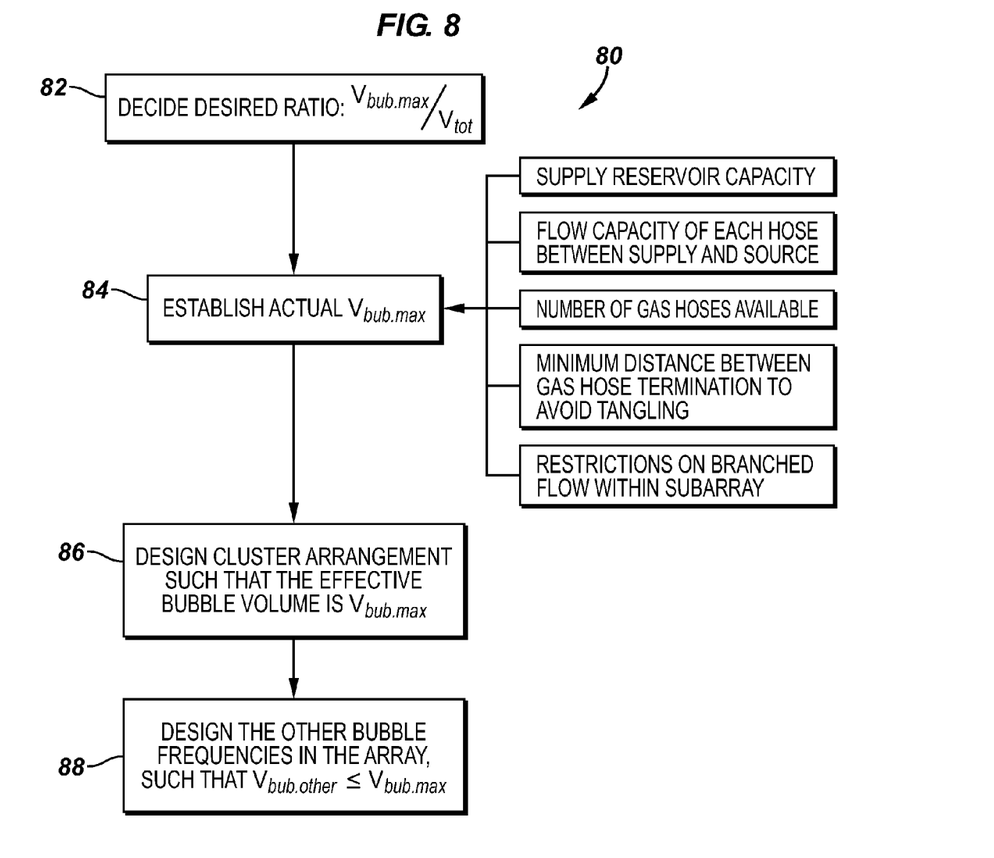
FIG. 8 is a process flow chart for designing a source array to optimize low frequency output.

In some embodiments, additional gas for tuning the source array by creating other distinct bubble frequencies may be desired. Accordingly, FIG. 8 depicts a flow chart 80 showing how a source can be designed, or re-designed, to take this into account. That is, an optimum low frequency source may be designed, while maintaining some spectral flatness given design restrictions imposed by the available equipment.

In step 82, the desired relative size of the largest effective bubble volume relative to the total source volume is determined. This ratio affects the trade-off between maximizing the low frequency output and flattening the spectrum by introducing additional bubble frequencies to fill-in the spectral notches. In this example, the desired size of the largest effective bubble is two-thirds of the total source volume available per shot.

Step 84 establishes the largest effective bubble volume that may be practically achieved given the restrictions imposed by the available equipment. For example, the total source volume per shot is limited by the flow capacity per high pressure gas hose and the number of hoses available. Referring to FIG. 8, which illustrates one exemplary implementation, only two gas hoses 90, 92 from a high pressure reservoir, e.g. the shipboard compressor, and a submerged source array 94 are available, with each hose having a flow capacity of, for example, 1680 in$^3$ per shot. Thus, in this example, the desired effective volume of the largest bubble is (1680+1680)·⅔=2240 in$^3$. However, in this example, the largest effective bubble volume is further limited by how close the two strings can be positioned to avoid tangling of the equipment while towing, so it is not possible to frequency lock gas bubbles from different strings. Consequently, the actual effective volume of the largest bubble may be 1680 in$^3$.

Referring again to FIG. 8, step 86 contemplates design of an airgun cluster arrangement 96 (FIG. 9) to achieve the largest bubble, i.e. the one that results in the 1680 in$^3$ effective bubble volume, which corresponds to the total volume available from one gas hose. In this example, the desired bubble frequency is achieved with six 280 in$^3$ airguns in close proximity.

Step 88 contemplates design of other bubble frequencies in the array. For example, instead of maximizing the low frequency output by duplicating the airgun arrangement in step 86, another other airgun subarray 98 may be arranged to use the remaining gas to flatten the spectrum. In this example, three additional bubble frequencies may be uniformly distributed, on a linear frequency scale, between the first bubble frequency and its first harmonic. The Rayleigh-Willis formula in Equation 1 gives the effective bubble volume of these other bubble frequencies: $V_2=1680/(1.25)^3 \approx 860$ in$^3$, $V_3=1680/(1.50)^3 \approx 498$ in$^3$, $V_4=1680/(1.75)^3 \approx 313$ in$^3$. In this example, the second largest effective bubble volume, $V_2$, is created by a three gun cluster having two 250 in$^3$ guns and one 360 in$^3$ gun. Similarly, $V_3$ is created by a two gun cluster having two 250 in$^3$ guns, and $V_4$ is a single airgun of 310 in$^3$.

Figure 9:
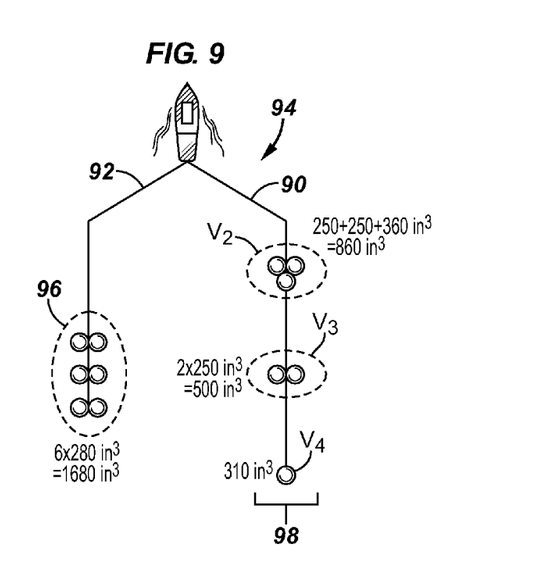
FIG. 9 is a schematic depiction of another source array designed to optimize low frequency output according to the principles of the present disclosure.
Figure 10:
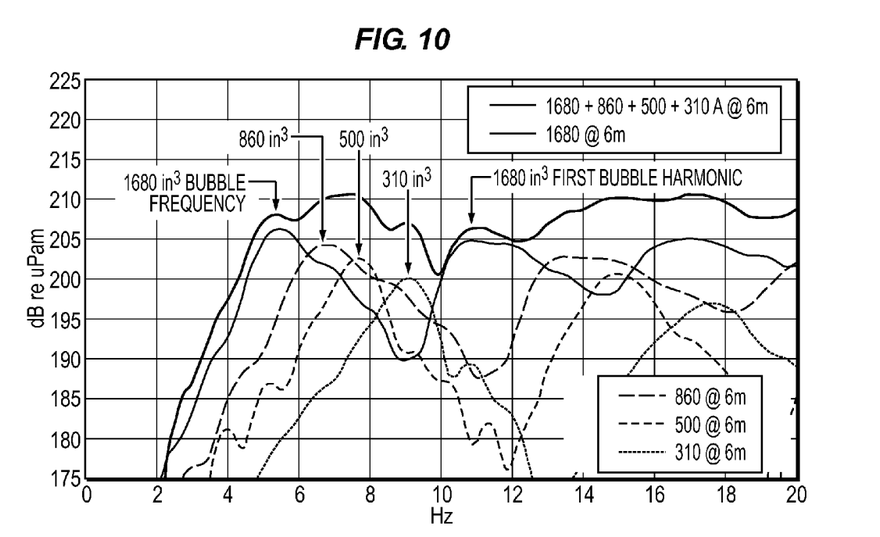
FIG. 10 is a graphical depiction of an estimated far field spectrum of the source array of FIG. 9.

Accordingly, the design of FIG. 9 achieves a largest effective bubble volume that is 50% of the total source volume, while also achieving spectral flattening using three additional bubble frequencies that are uniformly distributed between the frequency of the largest bubble and its first harmonic. The spectral flattening of this array is illustrated in FIG. 10.

Example 4

Redesign of a Conventional Cluster Source

Figure 11A:
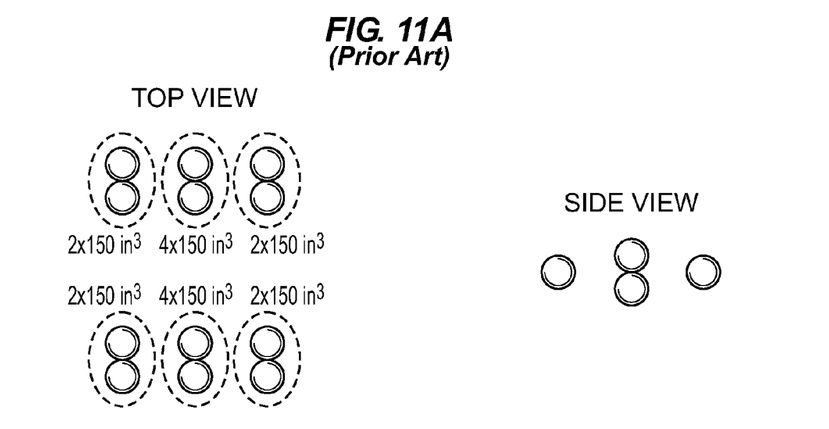
FIGS. 11a and 11b are a comparison of a conventional source array (FIG. 11a) and such source array redesigned to optimize low frequency output according to the principles of the present disclosure (FIG. 11b).

The teachings of the present disclosure provide useful methods for redesigning existing cluster arrays to optimize low frequency output. FIG. 11a depicts the layout of a conventional cluster source deployed in dual mode as described in U.S. Pat. No. 4,956,822. The prior art cluster source has been designed for enhanced spectral flatness, i.e. high primary-to-bubble ratio, with little regard for the very low frequency source output.

The value of the effective bubble volume, $V_{eff}$, can be calculated by solving the Rayleigh-Willis formula in Equation 1 for the bubble volume, V, and inputting values for air pressure (e.g., 2000 psi), source depth (e.g, 10 ft) and bubble frequency (e.g. 1/196.5 ms≈5.089 Hz).

$$V_{eff} = k^3 \frac{(1+d/10)^{15/6}}{P \cdot f^3} \tag{2}$$

Accordingly, use of these exemplary values leads to a maximum effective bubble volume of only 956 in$^3$, i.e. 40% of the total source volume of 2400 in$^3$. Although exemplary values were used to define the maximum effective bubble volume of the configuration of FIG. 11a, it is to be appreciated that this definition can be used to quantify the effective bubble volume(s) of any prior art source.

According to the principles of the present disclosure, such source can be redesigned to maximize the low frequency output while using the same total amount of compressed air and maintaining some spectral flatness. Assuming that the firing pressure is the same, i.e. 2000 psi, the source depth is the same, i.e. 10 ft, and that the total volume cannot exceed 2400 in$^3$ and that there are no other restrictions on how the total volume can be distributed, the source can be redesigned to have two distinct bubble frequencies. The first bubble frequency may be defined as low as possible and the second bubble frequency may be designed as being half an octave higher than the first bubble frequency, such that the second bubble frequency will coincide with the bubble notch of the first bubble frequency. This restriction can be expressed as $$V_{bub,max} \cdot (1+2^{-3/2}) = V_{tot} \tag{3}$$

In other words, the largest effective bubble may be approximately 74% of the total source volume. Consequently, the first bubble may oscillate with a frequency associated with 1773 in$^3$ and the second bubble may oscillate with a frequency associated with 627 in$^3$. Similar to the other examples disclosed herein, such bubble oscillations are obtained by fully frequency locking multiple airgun bubbles in close proximity.

Figure 11B:
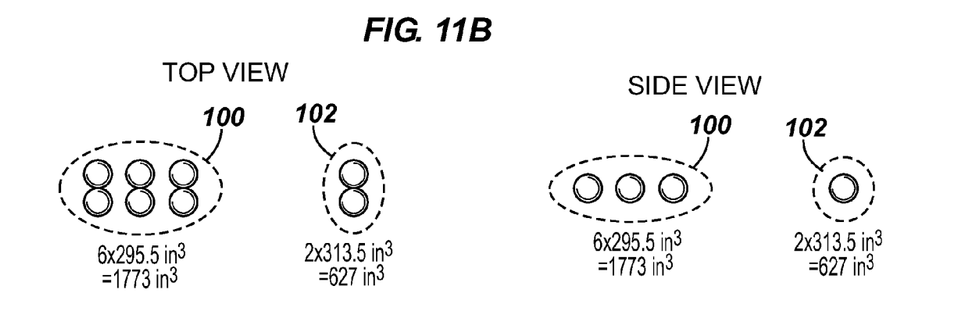

The redesigned low frequency source is depicted in FIG. 11b to have a pair of cluster units 100, 102, including a 1773 in$^3$ bubble, which may be constructed from six 295.5 in$^3$ guns, and a 627 in$^3$ bubble, which may be constructed from two 313.5 in$^3$ guns. The two cluster units are well separated such that the interaction between the cluster units is negligible. Redesigning the prior art cluster according to the principles disclosed herein increases the effective bubble volume from 956 in$^3$ to 1773 in$^3$, which at 10 ft depth corresponds to a bubble frequency of 5.1 and 4.1 Hz respectively. Accordingly, the bubble frequency has been shifted by 0.3 octave by redesigning the cluster source layout.

Although specific embodiments of the invention have been disclosed herein in some detail, this has been done solely for the purposes of describing various features and aspects of the invention, and is not intended to be limiting with respect to the scope of the invention. For example, although many of the drawings depict the use of towed source arrays, the teachings of the present disclosure are also applicable to source designs for vertical seismic profiling (VSP) surveys in which substantially stationary source arrays may be substituted for towed source arrays. It is therefore contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for increasing low frequency output of a marine source array having a total source volume, comprising:
   deploying a plurality of airguns; and
   activating at least some of the airguns to generate an effective bubble volume of more than 2000 in$^3$, the activating including activating at least some of the airguns in such a way that the effective bubble volume is at least one-third the size of the total source volume.

2. A method according to claim 1, wherein the step of activating comprises activating at least some of the airguns to generate multiple frequency locked bubbles.

3. A method according to claim 2, wherein the marine source array has a total source volume, and wherein the step of activating comprises activating at least some of the airguns to generate multiple frequency locked bubbles having an effective bubble volume of greater than 1500 in$^3$, and wherein the effective bubble volume is between 33% and 74% of the total source volume.

4. A method according to claim 2, wherein the step of activating comprises activating at least some of the airguns to generate multiple frequency locked bubbles, the multiple frequency locked bubbles having an effective bubble volume of greater than 5000 in$^3$.

5. A method according to claim 1, wherein the marine source array has a total source volume, and wherein the step of activating comprises activating the airguns in such a way that the effective bubble volume is substantially equal to the total source volume.

6. A method according to claim 1, wherein the step of deploying comprises deploying one or more subarrays in a towed marine seismic survey.

7. A method according to claim 6, wherein deploying one or more subarrays comprises deploying three subarrays in a substantially parallel arrangement, the outer subarrays having a substantially identical configuration, and wherein activating at least some of the airguns comprises activating the airguns in the outer subarrays to achieve full frequency locking of bubbles emitted by the airguns.

8. A method according to claim 6, wherein deploying one or more subarrays comprises deploying one subarray having a plurality of airguns positioned in close proximity to one another, and wherein activating at least some of the airguns comprises activating all of the airguns in the subarray to achieve full frequency locking of bubbles emitted by the airguns.

9. A method according to claim 1, wherein the step of deploying comprises deploying a plurality of airguns in one of a vertical seismic profiling survey, a seabed seismic survey and a borehole seismic survey.

10. A method according to claim 1, wherein the effective bubble volume is defined as at least partially frequency locked bubbles.

11. A method according to claim 1, wherein the effective bubble volume is defined as frequency locked bubbles.

12. A method according to claim 1, wherein the effective bubble volume is defined as a volume of coalesced bubbles.

13. A method according to claim 1, wherein the effective bubble volume is defined as a volume associated with a frequency of the combined volume of the airguns.

* * * * *